Jan. 22, 1952     E. A. BEILKE     2,583,290
ATTACHMENT FOR SPRING TOOTH HARROWS
Filed Sept. 25, 1948
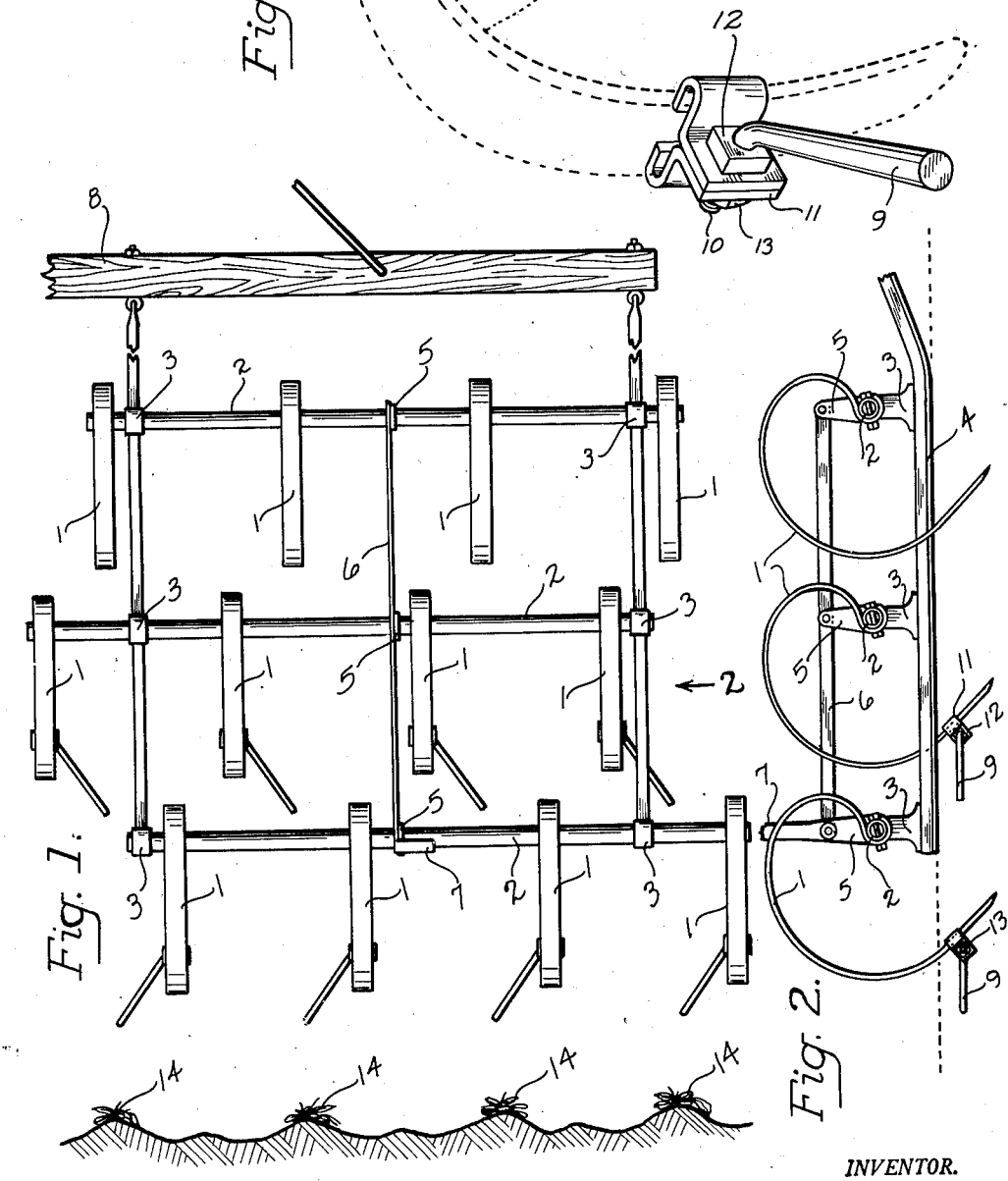
INVENTOR.
Emil A. Beilke
BY
Atty Patented Jan. 22, 1952

2,583,290

UNITED STATES PATENT OFFICE 2,583,290

ATTACHMENT FOR SPRING TOOTH HARROWS

Emil A. Beilke, Pendleton, Oreg.

Application September 25, 1948, Serial No. 51,220

1 Claim. (Cl. 55—36)

My invention pertains to spring tooth harrows, and relates particularly to a novel attachment therefor by which the roots of weeds loosened by the action of the harrow are brought to the surface of the ground, and the weeds are left to dry on said surface.

The employment of a spring tooth harrow for tilling soil provides the desirable feature of breaking the soil into relatively small lumps, and avoids pulverization and subsequent loss of the rich top soil. Additionally, the harrow provides a roughened or slightly furrowed ground surface for effective drainage of water. There is but one major disadvantage in the use of the harrow, viz. the teeth of the harrow do not extract the roots of weeds from the soil, and leave all of the weeds lying on the surface. In fact, the harrow frequently conditions the soil surrounding the weed roots to the extent that growth of the latter is enhanced.

It is accordingly a primary object of my invention to provide an attachment for spring tooth harrows by which the roots of weeds are loosened from the soil and the weeds are dragged out and laid upon the surface of the ground. By removing the roots from the soil the weed cannot obtain food and, upon exposure to the elements, soon dies.

Another object is to provide an attachment which may be mounted adjustably upon the spring tooth of the harrow to accommodate the removal of weeds whose roots extend to different depths into the soil.

These and other objects and advantages of my invention will appear from the following detailed description taken in connection with the accompanying drawing in which:

Fig. 1 is a fragmentary plan view of a spring tooth harrow upon which is mounted weeding attachments embodying my invention;

Fig. 2 is a fragmentary side elevation as viewed in the direction of arrow 2 in Fig. 1;

Fig. 3 is a perspective view of an attachment embodying my invention showing the same mounted upon a spring tooth of a harrow, a fragment of said tooth being illustrated in dotted outline;

Fig. 4 is a fragmentary sectional view of ground treated by the harrow and attachment shown in Fig. 1.

A conventional spring tooth harrow comprises a plurality of spring steel teeth 1 firmly mounted at spaced intervals on a series of tubular rods 2. The rods are journaled in bearing brackets 3 mounted upon spaced parallel runners 4. Projecting brackets 5 firmly mounted at one end on the rods 2 are pivotally joined together by a reach bar 6. One of the brackets 5 is extended to form a lever 7. As the lever is rotated through a vertical arc about the attached rod 2 as an axis, the reach bar 6 moves horizontally and causes the remaining brackets 5 to rotate in unison with the lever. The rods 2 are thus rotated to provide vertical and angular adjustment of the teeth 1.

The harrow section illustrated in the drawing comprises three parallel rods 2 of equal length with four teeth mounted upon each rod. A number of harrow sections may be combined by attaching each to an elongated draw bar 8 in manner well known in the art. The number of rows and the number of teeth are not critical and the arrangement shown is merely for the purpose of illustration. The rods are arranged in a horizontal plane in such manner that the teeth on adjacent rods are staggered, or offset, from each other in the longitudinal direction of the harrow. Thus, as the harrow is drawn over the ground the spaced teeth break up the soil and form evenly spaced ridges and furrows therein. This construction provides for efficient and uniform action upon the soil. But the teeth do not effectively lift and uproot weeds from the soil, and it is for this particular purpose that the attachment now to be described is especially suited.

The weeding attachment embodying my invention comprises a metal rod 9 which is bent obliquely at one end. Threads 10 are formed on said bent end. Two elongated pieces of metal are bent at one end to form U-shaped jaws which, when arranged in opposing relationship, form a C-shaped clamp 11 which releasably engages a harrow tooth 1. Alined holes or openings are provided in said clamp to receive the threaded end of the rod 9. A nut 12 is threaded onto said rod to form a shoulder against which the clamp abuts. Alternatively, the shoulder may be formed as an integral part of the rod 9, if desired. A locking nut 13 is then threaded loosely onto the rod and the clamp is slid over the harrow tooth.

Referring particularly to Fig. 2 of the drawing, the clamp 11 is arranged on the harrow tooth 1 in such manner as to place the weeding rod 9 a short distance below the surface of the ground. For general purposes the rod is positioned about two inches below the surface of the ground since the majority of weeds have roots about four inches in length. Specific types of weeds may have longer or shorter roots, and the rod is adjusted accordingly. When the attachment has been adjusted to the proper position the locking nut 13 is tightened upon the rod, thereby drawing the clamp 11 securely about the harrow tooth.

The weeding rod 9 extends rearwardly of the harrow tooth at an oblique angle thereto and is arranged parallel with the surface of the ground. As the harrow is drawn over the ground the teeth 1 penetrate and break up the soil. The weeding rods engage the roots of the weeds at a point approximately midway between the end of the root and the surface of the ground. The root is caused to bend around the rod 9 and is dragged forward with the movement of the harrow. Since the exposed portion of the weed is substantially longer than the root, the forward movement of the latter is resisted by the exposed portion, and the weed is brought to a horizontal position. As the weed is dragged along the ground the root thereof slides outwardly along the obliquely arranged rod 9 until it is disengaged therefrom.

The arrangement of the weeding attachments upon the plurality of teeth comprising the harrow is not critical to the proper functioning thereof, although I prefer the arrangement illustrated in Fig. 1 of the drawing. The rods 9 are positioned to the left of the teeth which make up the rear bank of the harrow, and the rods on the middle bank extend to the right. The front bank usually is not provided with the weeding attachments. With this construction the weeds 14 loosened by the harrow teeth are deposited upon the surface of the ground in windrows, as shown in Fig. 4. This occurs because the rods 9 direct the weeds toward lines extending parallel with the direction of travel of the harrow. Additionally, it will be noticed that the ridges upon which the weeds 14 are deposited are of greater height than the intermediate ridges. This result occurs because the rods 9 push the soil upwardly as they travel through the ground. The weeds thus deposited are subject to maximum exposure to the sun, dry, and are thereby destroyed in a minimum of time.

I claim:

A weeding attachment for spring tooth harrows comprising a rod bent obliquely at one end, threads on said bent end, elongated members having U-shaped jaws arranged to form a clamp for detachably engaging a tooth of said harrow, registering openings in said elongated members, said threaded bent end extending through said registering openings, and means on said threaded end for detachably securing said clamp and rod together, and said clamp to said tooth, said rod extending obliquely rearwardly of said tooth and disposed to travel parallel with the surface of and through the soil to be treated.

EMIL A. BEILKE.

REFERENCES CITED

The following references are of record in the file of this patent:

UNITED STATES PATENTS

| Number | Name | Date |
| --- | --- | --- |
| 449,649 | Smith | Mar. 31, 1891 |
| 451,966 | Wilson | May 12, 1891 |
| 856,916 | Schad | June 11, 1907 |
| 1,878,443 | Hudec et al. | Sept. 20, 1932 |

FOREIGN PATENTS

| Number | Country | Date |
| --- | --- | --- |
| 20,248 | France | Mar. 14, 1917 |